(12) United States Patent
Lei

(10) Patent No.: US 12,009,934 B2
(45) Date of Patent: Jun. 11, 2024

(54) METHOD AND APPARATUS FOR TRANSMITTING HARQ-ACK FEEDBACK ON UNLICENSED SPECTRUM

(71) Applicant: LENOVO (BEIJING) LIMITED, Beijing (CN)

(72) Inventor: Haipeng Lei, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 675 days.

(21) Appl. No.: 17/266,255

(22) PCT Filed: Aug. 10, 2018

(86) PCT No.: PCT/CN2018/099977
§ 371 (c)(1),
(2) Date: Feb. 5, 2021

(87) PCT Pub. No.: WO2020/029252
PCT Pub. Date: Feb. 13, 2020

(65) Prior Publication Data
US 2021/0306113 A1    Sep. 30, 2021

(51) Int. Cl.
*H04L 1/18*     (2023.01)
*H04L 1/1867*   (2023.01)
*H04L 5/00*     (2006.01)
*H04W 72/1268*  (2023.01)

(52) U.S. Cl.
CPC .......... *H04L 1/1887* (2013.01); *H04L 1/1896* (2013.01); *H04L 5/0055* (2013.01); *H04W 72/1268* (2013.01)

(58) Field of Classification Search
CPC ... H04L 1/1887; H04L 1/1854; H04L 1/1896; H04L 1/1607; H04L 5/0055; H04W 72/1268
See application file for complete search history.

(56) References Cited

FOREIGN PATENT DOCUMENTS

| CN | 101588224 A | 11/2009 |
| CN | 102394685 A | 3/2012 |

OTHER PUBLICATIONS

HARQ enhancements in NR unlicensed, 3GPP TSG RAN WG1 Meeting #93, R1-1805918. May 25, 2018 (Year: 2018).*
3GPP, 3rd Generation Partnership Project; Technical Specification Group Radio Access Network; HARQ enhancements in NR unlicensed, 3GPP R1-1805918, May 2018, pp. 1-5.

(Continued)

*Primary Examiner* — Jamal Javaid
(74) *Attorney, Agent, or Firm* — Kunzler Bean & Adamson

(57) ABSTRACT

The present application is related to a method and apparatus for transmitting HARQ-ACK feedback on unlicensed spectrum. A method for HARQ-ACK multiplexing includes receiving a plurality of downlink transmissions, generating a HARQ-ACK codebook corresponding to the plurality of downlink transmissions, wherein the HARQ-ACK codebook is to be transmitted in a slot, receiving another plurality of downlink transmissions; generating another HARQ-ACK codebook corresponding to the another plurality of downlink transmissions, wherein the another HARQ-ACK codebook is to be transmitted in the slot, and transmitting the HARQ-ACK codebook on an uplink channel in the slot.

20 Claims, 9 Drawing Sheets

(56) References Cited

OTHER PUBLICATIONS

International Searching Authority, "Notification of Transmittal of the International Search Report and the Written Opinion of the International Searching Authority, or the Declaration", PCT/IB2018/099977, dated Aug. 10, 2018, pp. 1-7.

\* cited by examiner

|  | b4 | b5 | b6 |
|---|---|---|---|
| 1st OCC code: {+1,+1,+1,+1} | ACK | ACK | ACK |
| 2nd OCC code: {-1,-1,-1,-1} | NACK | ACK | ACK |
| 3rd OCC code: {+1,+1,-1,-1} | ACK | NACK | ACK |
| 4th OCC code: {-1,-1,+1,+1} | NACK | NACK | ACK |
| 5th OCC code: {+1,-1,+1,-1} | ACK | ACK | NACK |
| 6th OCC code: {-1,+1,-1,+1} | NACK | ACK | NACK |
| 7th OCC code: {+1,-1,-1,+1} | ACK | NACK | NACK |
| 8th OCC code: {-1,+1,+1,-1} | NACK | NACK | NACK |

FIG. 6

METHOD AND APPARATUS FOR TRANSMITTING HARQ-ACK FEEDBACK ON UNLICENSED SPECTRUM

TECHNICAL FIELD

Embodiments of the present application generally relate to technology about hybrid automatic repeat request-acknowledgement (HARQ-ACK) feedback, and more specifically to transmitting HARQ-ACK feedback on unlicensed spectrum.

BACKGROUND

In wireless communication technology, HARQ-ACK feedback technology is commonly used during data transmission, to provide feedback on whether data was correctly received in the downlink (DL) or uplink (UL) transmission. HARQ-ACK represents collectively the Positive Acknowledgement (ACK) and the Negative Acknowledgement (NACK). ACK means data was correctly received while NACK means data was erroneously received. For example, HARQ-ACK feedback information may be called a HARQ-ACK codebook.

In some cases, HARQ-ACK feedback information for different data transmissions is generated asynchronously but need to be transmitted simultaneously. Thus, issues on how to multiplex HARQ-ACK feedback information for different data transmissions need to be solved, so as to save channel resources and enhance transmission efficiencies. Thus, a mechanism of multiplexing HARQ-ACK feedback information for different data transmissions is desirable.

SUMMARY

One objective of the present application is to provide a mechanism of multiplexing HARQ-ACK feedback information for different data transmissions.

One embodiment of the present application provides a method, which can be used for HARQ-ACK multiplexing in a remote unit. The method includes receiving a plurality of downlink transmissions; generating a HARQ-ACK codebook corresponding to the plurality of downlink transmissions, wherein the HARQ-ACK codebook is to be transmitted in a slot; receiving another plurality of downlink transmissions; generating another HARQ-ACK codebook corresponding to the another plurality of downlink transmissions, wherein the another HARQ-ACK codebook is to be transmitted in the slot; and transmitting the HARQ-ACK codebook on an uplink channel in the slot.

Another embodiment of the present application provides an apparatus. The apparatus includes a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement methods for HARQ-ACK multiplexing, for example in a remote unit.

Yet another embodiment of the present application also provides a method, which can be used for HARQ-ACK multiplexing in a base unit. The method includes transmitting a plurality of downlink transmissions, wherein a HARQ-ACK codebook corresponding to the plurality of downlink transmissions is to be received in a slot; transmitting another plurality of downlink transmissions, wherein another HARQ-ACK codebook corresponding to the another plurality of downlink transmissions is to be received in the slot; receiving the HARQ-ACK codebook on an uplink channel in the slot.

A further embodiment of the present application also provides an apparatus. The apparatus includes a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement methods for HARQ-ACK multiplexing, for example in a base unit.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only example embodiments of the present application and are not therefore to be considered as limiting of its scope.

FIG. 6 illustrates an additional exemplary method of multiplexing HARQ-ACK feedback information according to some embodiments of the present application;

DETAILED DESCRIPTION

The detailed description of the appended drawings is intended as a description of the currently preferred embodiments of the present application, and is not intended to represent the only form in which the present application may be practiced. It should be understood that the same or equivalent functions may be accomplished by different embodiments that are intended to be encompassed within the spirit and scope of the present application.

Embodiments of the present application provide methods and apparatuses for HARQ-ACK multiplexing. To facilitate understanding, embodiments of the present application are provided under specific network architecture and new service scenarios, such as 3GPP 5G NR (new radio), 3GPP LTE (Long Term Evolution) Release 8 and onwards. Persons skilled in the art are well-aware that, with developments of network architecture and new service scenarios, the embodiments in the subject disclosure are also applicable to similar technical problems.

Figure 1:
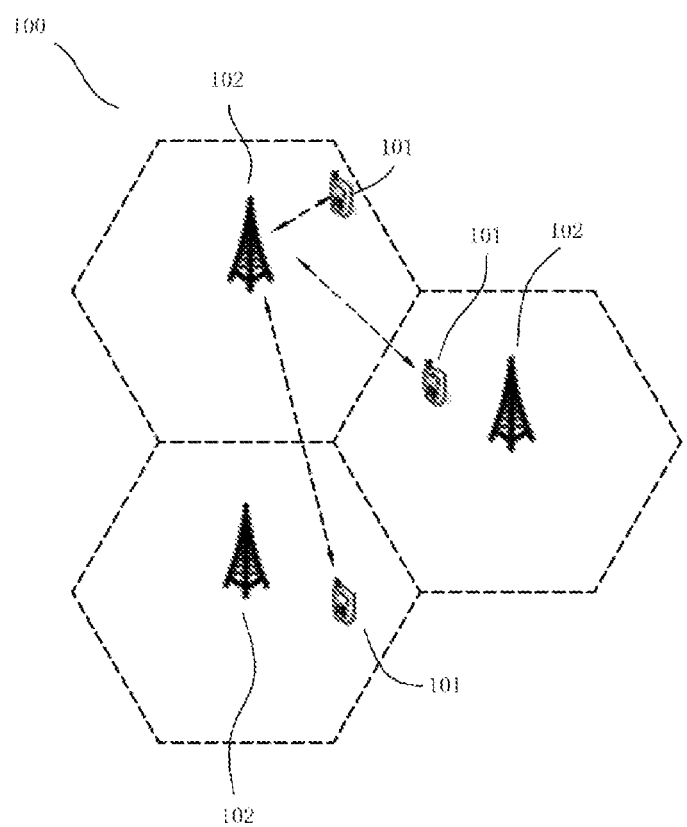
FIG. 1 illustrates a block diagram of a wireless communication system according to some embodiments of the present application.

FIG. 1 illustrates a block diagram of a wireless communication system according to some embodiments of the present application.

As shown in FIG. 1, the wireless communication system 100 includes remote units 101 and base units 102. Even though a specific number of remote units 101 and base units 102 are depicted in FIG. 1, one of skill in the art will recognize that any number of remote units 101 and base units 102 may be included in the wireless communication system 100.

The remote units 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to some embodiments of the present application, the remote units 101 may include a portable wireless communication device, a smart phone, a cellular telephone, a flip phone, a device having a subscriber identity module, a personal computer, a selective call receiver, or any other device that is capable of sending and receiving communication signals on a wireless network. In an embodiment, the remote units 101 include wearable devices, such as smart watches, fitness bands, optical head-mounted displays, or the like. Moreover, the remote units 101 may be referred to as subscriber units, mobiles, mobile stations, users, terminals, mobile terminals, wireless terminals, fixed terminals, subscriber stations, UE, user terminals, a device, or by other terminology used in the art. The remote units 101 may communicate directly with a base unit 102 via uplink (UL) communication signals.

The base units 102 may be distributed over a geographic region. In certain embodiments, a base unit 102 may also be referred to as an access point, an access terminal, a base, a base station, a macro cell, a Node-B, an enhanced Node B (eNB), a gNB, a Home Node-B, a relay node, a device, or by any other terminology used in the art. The base units 102 are generally part of a radio access network that may include one or more controllers communicably coupled to one or more corresponding base units 102.

The base units 102 are generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more base units 102 may be communicably coupled to a mobility management entity (MME), a serving gateway (SGW), and/or a packet data network gateway (PGW).

The base units 102 may serve a number of remote units 101 within a serving area, for example, a cell or a cell sector via a wireless communication link. The base units 102 may communicate directly with one or more of the remote units 101 via communication signals. For example, a base unit 102 may serve remote units 101 within a macro cell.

The base units 102 transmits downlink (DL) communication signals to serve the remote units 101 in the time, frequency, and/or spatial domain. Furthermore, the DL communication signals may be carried over wireless communication links. The wireless communication links may be any suitable carrier in licensed or unlicensed radio spectrum. The wireless communication links facilitate communication between the remote units 101 and the base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In some embodiments, the wireless communication system 100 is compliant with the long-term evolution (LTE) of the 3GPP protocol, wherein the base unit 102 transmits using an orthogonal frequency division multiplexing (OFDM) modulation scheme on the DL and the remote units 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In some embodiments, the base unit 102 may communicate using other communication protocols, such as the IEEE 802.11 family of wireless communication protocols. Further, in an embodiment, the base unit 102 may communicate over licensed spectrum, while in other embodiments the base unit 102 may communicate over unlicensed radio spectrum. The present application is not intended to be limited to the implementation of any particular wireless communication system architecture or protocol. In another embodiment, the base unit 102 may communicate with remote units 101 using the 3GPP 5G protocols.

According to some embodiments of the present application, downlink (DL) transport blocks (TBs) are carried on the Physical Downlink Shared Channel (PDSCH). The HARQ-ACK bits corresponding to the PDSCH are transmitted either on the Physical Uplink Control Channel (PUCCH) or on the Physical Uplink Shared Channel (PUSCH). A maximum of two TBs can be transmitted in one PDSCH in one serving cell and in one slot.

For 3GPP 5G NR access on unlicensed spectrum (NR-U), HARQ-ACK feedback or HARQ-ACK codebook needs to be transmitted on unlicensed carrier in Dual-connectivity (DC) scenario, carrier aggregation (CA) scenario, or other deployment scenarios. In a specific deployment scenario for NR-U, in the case that HARQ-ACK feedback is to be transmitted on unlicensed carrier from a remote unit to a base unit, a failure of LBT (listen-before-talk) procedure may lead to a failure of HARQ-ACK feedback transmission. Likewise, other factors of the wireless network architecture may also lead to the failure of HARQ-ACK feedback transmission.

For example, in the case that a remote unit is to transmit HARQ-ACK feedback on unlicensed carriers, before transmitting the HARQ-ACK feedback, a LBT procedure needs to be performed. If the LBT procedure is successful, the remote unit may transmit the HARQ-ACK feedback on the unlicensed carrier. If the LBT procedure failed, the remote unit has to give up the HARQ-ACK transmission. For a further example, HARQ-ACK transmission on unlicensed carrier may suffer potential interference from hidden network nodes in a deployment scenario of the wireless network.

Both LBT procedure failure and hidden network node problem may lead to unnecessary DL retransmission and DL performance degradation due to failed HARQ-ACK reception at a base unit side. Specifically, at the remote unit side, although the remote unit correctly receives data transmitted from the base unit, HARQ-ACK feedback corresponding to the received data cannot be transmitted to the base unit. At the base unit side, in response to not receiving HARQ-ACK feedback corresponding to previously transmitted data, the base unit may make a decision that the previously transmitted data was erroneously received by the remote unit and retransmit the previous data on DL. This case results in unnecessary DL retransmission and DL performance degradation.

Considering a risk of HARQ-ACK transmission on unlicensed carrier and importance of HARQ-ACK feedback, in RAN1#93 meeting, agreements regarding NR access on unlicensed spectrum are made for HARQ enhancement below: in the case that UL HARQ-ACK feedback is transmitted on unlicensed carrier, NR-U considers mechanisms to support flexible triggering and multiplex HARQ-ACK feedback for one or more DL HARQ-ACK processes. The basic principle for HARQ-ACK feedback for NR-U is to provide multiple transmission opportunities for one HARQ-ACK feedback.

According to an example of the present application, a remote unit can be configured to have N opportunities to transmit a HARQ-ACK feedback by radio resource control (RRC) signaling. For the HARQ-ACK feedback, if a LBT procedure for the first transmission failed, the remote unit can still have (N−1) opportunities to transmit the HARQ-ACK feedback. From the remote unit's perspective, if the LBT procedure for the $n^{th}$ opportunity is successful, $1<=n<=N$, the $n^{th}$ opportunity is used to transmit the HARQ-ACK feedback, and the remaining (N−n) opportunities can be left unused or can be used for repeating the HARQ-ACK feedback to enhance transmission reliability.

Figure 2:
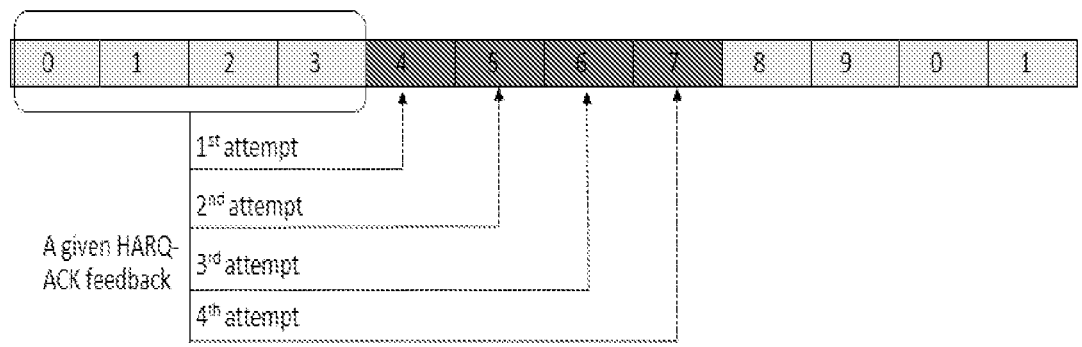
FIG. 2 illustrates an exemplary method of transmitting HARQ-ACK feedback information according to some embodiments of the present application.

FIG. 2 illustrates an exemplary method of transmitting HARQ-ACK feedback according to an embodiment of the present application.

As shown in FIG. 2, for a plurality of DL transmissions received in a slot set of slot 0, 1, 2 and 3, a HARQ-ACK feedback can be generated and then transmitted in one PUSCH/PUCCH, and can be called as a given HARQ-ACK feedback or a given HARQ-ACK codebook. The given HARQ-ACK feedback can be configured with four transmission opportunities (the $1^{st}$, $2^{nd}$, $3^{rd}$, and $4^{th}$ attempts as shown in FIG. 2), for example by RRC signaling. The four transmission opportunities can be consecutive. The number of transmission opportunities of the given HARQ-ACK codebook can vary. For example, in an embodiment of the present application, the number of transmission opportunities of the given HARQ-ACK codebook can be three or five etc.

According to the embodiment of FIG. 2, in the case that the LBT procedure for the first attempt for a given HARQ-ACK feedback in slot 4 failed (i.e., the given HARQ-ACK feedback cannot be transmitted in the first transmission opportunity), a next LBT procedure for a slot subsequent to slot 4 (i.e., slot 5) can be implemented (i.e., the second attempt). In the case that the LBT procedure for the second attempt for a given HARQ-ACK feedback in slot 5 failed, that is, the given HARQ-ACK feedback cannot be transmitted in the second transmission opportunity, a next LBT procedure for a slot subsequent to slot 5 (i.e., slot 6) can be implemented, and so on until all the transmission opportunities are used or a LBT procedure is successful within the configured transmission opportunities. For example, in the case that the LBT procedure for the second attempt in slot 5 is successful, the given HARQ-ACK feedback can be transmitted in the PUCCH of slot 5. Accordingly, PUCCH resources allocated for slots 6 and 7 can leave unused or be used for repeating the given HARQ-ACK feedback. For example, in an embodiment of the present application, the PUCCH resources allocated for slots 6 and 7 can be used for repeating the given HARQ-ACK feedback previously carried on PUCCH of slot 5 to enhance the reliability.

Figure 3:
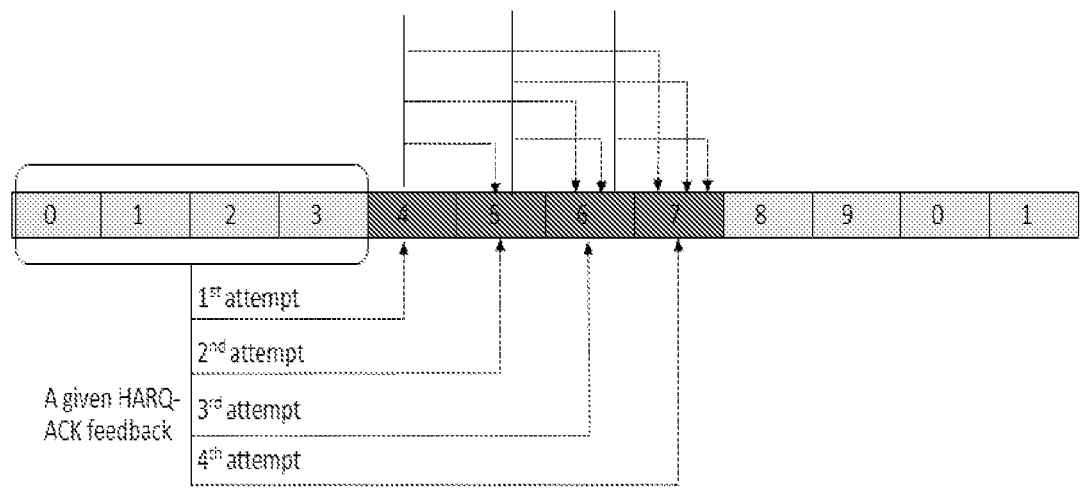
FIG. 3 illustrates an exemplary method of transmitting HARQ-ACK feedback information according to some embodiments of the present application.

However, other HARQ-ACK feedback may be generated for data transmissions received in slots 4, 5, 6 and 7 etc., which may be transmitted in a slot subsequent to the slots transmitting the data transmissions, i.e., slot 5, 6, 7 and 8 etc. Accordingly, in the case of transmitting the given HARQ-ACK feedback in subsequent slot(s) e.g., slot 5, slot 6, and/or slot 7 via the second, third and/or fourth transmission opportunity, rather than slot 4 via the first opportunity, the given HARQ-ACK feedback transmission may collide with other HARQ-ACK feedback transmission, for example as shown in FIG. 3. To differ from the given HARQ-ACK feedback, the other HARQ-ACK feedback colliding with the given HARQ-ACK feedback can be called as an additional HARQ-ACK feedback/information bit.

FIG. 3 illustrates an exemplary method of transmitting HARQ-ACK feedback according to some embodiments of the present application. Similar to the embodiment of FIG. 2, in the embodiment of FIG. 3, for a plurality of DL transmissions received in a slot set of slot 0, 1, 2 and 3, a HARQ-ACK feedback can be generated and then transmitted in one PUSCH/PUCCH, and can be called as a given HARQ-ACK feedback or a given HARQ-ACK codebook. The given HARQ-ACK feedback can be configured with four transmission opportunities, i.e., the $1^{st}$, $2^{nd}$, $3^{rd}$, and $4^{th}$ attempts as shown in FIG. 3 to be transmitted. The four transmission opportunities can be consecutive. Moreover, the number of transmission opportunities of a given HARQ-ACK codebook may be different from other embodiments of the present application.

In the embodiment of FIG. 3, in the case that the LBT procedure for the first attempt for a given HARQ-ACK feedback in slot 4 failed (i.e., when the given HARQ-ACK feedback cannot be transmitted in the first transmission opportunity), a next LBT procedure for a slot subsequent to slot 4 (i.e., slot 5) can be implemented (i.e., the second attempt). In the case that the LBT procedure for the second attempt for a given HARQ-ACK feedback in slot 5 failed (i.e., when the given HARQ-ACK feedback cannot be transmitted in the second transmission opportunity), a next LBT procedure for a slot subsequent to slot 5 (i.e., slot 6) can be implemented, and so on until all the transmission opportunities are used or a LBT procedure is successful within the configured transmission opportunities.

Specifically, in the case that the LBT procedure for the second attempt in slot 5 is successful, the given HARQ-ACK feedback can be transmitted in a PUCCH of slot 5. However, a HARQ-ACK feedback corresponding to DL transmission received in slot 4 may also need to be transmitted in slot 5. In this situation, the given HARQ-ACK feedback to be transmitted in slot 5 collides with the HARQ-ACK feedback corresponding to DL transmissions received in slot 4.

Similarly, the LBT procedures for slots 4 and 5 both failed while the LBT procedure for the third attempt in slot 6 is successful, the given HARQ-ACK feedback can be transmitted in the PUCCH of slot 6. In the case that a HARQ-ACK feedback corresponding to DL transmission received in slot 4 and/or another HARQ-ACK feedback corresponding to DL transmission received in slot 5 also need to be transmitted, these HARQ-ACK feedback (i.e., the given HARQ-ACK feedback, the HARQ-ACK feedback corresponding to DL transmission received in slot 4, and the HARQ-ACK feedback corresponding to DL transmission received in slot 5) collide with each other.

Similarly, all LBT procedures for slots 4, 5 and 6 failed while the LBT procedure for the fourth attempt in slot 7 is successful, the given HARQ-ACK feedback can be transmitted in a PUCCH of slot 7. In this case, in slot 7, the given HARQ-ACK feedback may collide with the HARQ-ACK feedback corresponding to DL transmission received in slot 6 and failed HARQ-ACK feedbacks corresponding to DL transmission received in slot 4 and slot 5 respectively.

Generally, a base unit transmits data to a remote unit in multiple slots, and a remote unit needs to transmit HARQ-ACK feedback corresponding to the DL transmission received from the multiple slots. Since process time of the remote unit is limited, it is quite difficult for the remote unit to include an additional HARQ-ACK information bit into a given HARQ-ACK feedback. For example, in the embodiment of FIG. 3, in the case that the given HARQ-ACK feedback corresponding to DL transmissions received in slots 0, 1, 2 and 3 is to be transmitted in slot 5, it is difficult or even impossible for the remote unit to drop the given HARQ-ACK feedback and regenerate a new HARQ-ACK codebook corresponding to all DL transmissions received in slots 0, 1, 2, 3 and 4. Similarly, in the case that the given HARQ-ACK feedback corresponding to DL transmission received in slots 0, 1, 2 and 3 is to be transmitted in slot 6, it is difficult or impossible for a remote unit to drop the given HARQ-ACK feedback and regenerate a new HARQ-ACK codebook corresponding to all DL transmission received in slots 0, 1, 2, 3, 4 and 5.

Under this scenario, the remote unit faces the problem concerns how to multiplex the additional HARQ-ACK information bit with the given HARQ-ACK codebook. According to some embodiments of the present application, the given HARQ-ACK feedback transmission and the other HARQ-ACK feedback transmission can be multiplexed, so that the multiplexed HARQ-ACK feedback can be transmitted in the same slot. Although a given HARQ-ACK feedback is defined for a plurality of DL transmissions received in slots 0, 1, 2 and 3 in FIGS. 2 and 3, persons skilled in the art can understand that the given HARQ-ACK feedback can also be defined for a plurality of DL transmissions received in other slot set, such as a slot set of slot 4, 5, 6, 7 and etc., which may be transmitted in slot 8 or 9 and etc., according to the configured transmission opportunities.

More details on the embodiments of the present application will be illustrated in the following text in combination with the appended drawings.

Figure 4:
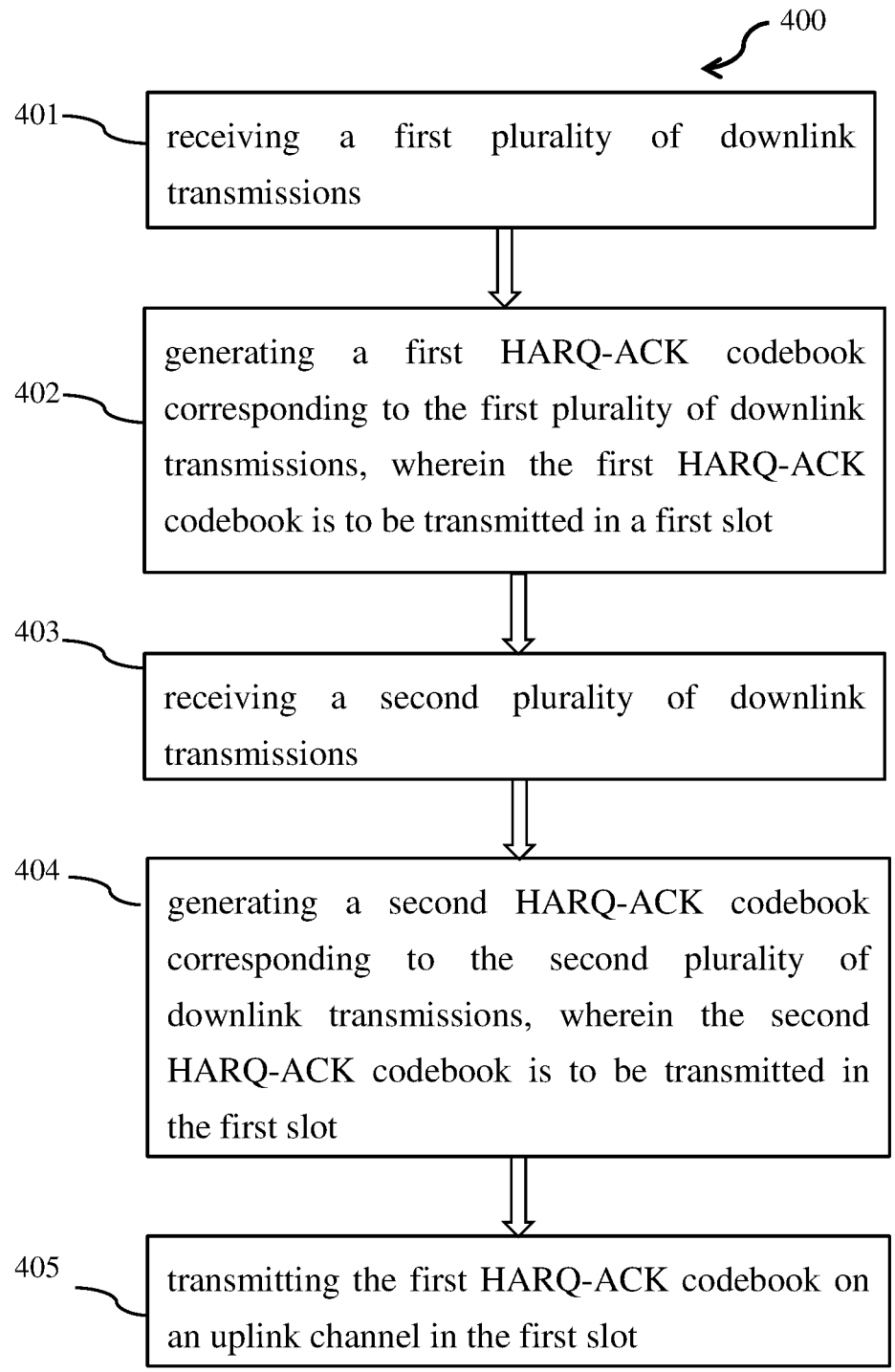
FIG. 4 illustrates a flowchart demonstrating operations of a remote unit according to some embodiments of the present application.

FIG. 4 illustrates a flowchart demonstrating operations of a remote unit according to some embodiments of the present application. In some embodiments of the present application, the method 400 is performed by an apparatus, such as a remote unit. In some embodiments of the present application, the method 400 can be performed by a processor executing program codes, for example, a microcontroller, a microprocessor, a CPU, a GPU, an auxiliary processing unit, a FPGA, or the like.

In step 401 of FIG. 4, a first plurality of downlink transmissions can be received. In step 402, a first HARQ-ACK codebook corresponding to the first plurality of downlink transmissions can be generated. In step 403, a second plurality of downlink transmissions can be received. In step 404, a second HARQ-ACK codebook corresponding to the second plurality of downlink transmissions can be generated. In step 405, the first HARQ-ACK codebook can be transmitted on an uplink channel in a first slot.

In some embodiments of the present application, the second HARQ-ACK codebook can also be transmitted in the first slot. For example, the second HARQ-ACK codebook is also transmitted on the uplink channel in the first slot. The second HARQ-ACK codebook may be modulated and transmitted in one or more time-frequency resource elements (REs) of the uplink channel. For instance, one or more time-frequency REs may be configured by radio resource control RRC signaling.

In some embodiments of the present application, the second HARQ-ACK codebook can be multiplexed into the first HARQ-ACK codebook, and the multiplexed HARQ-ACK feedback information can be transmitted on a PUCCH or a PUSCH. PUCCH format 2 and 3 may occupy multiple physical resource blocks (PRBs) in frequency domain and carry HARQ-ACK feedback on unlicensed radio spectrum. Within each PRB of the PUCCH carrying a given HARQ-ACK feedback, one or more specific REs in the PUCCH may be predefined to carry one or more additional HARQ-ACK information bits. One or more specific REs for uplink control information (UCI) payload on an uplink channel may be used to carry the additional HARQ-ACK information bits. The given HARQ-ACK feedback on the PUCCH may be punctured or rate matched on the remaining REs of the uplink channel.

In some embodiments of the present application, a demodulation reference signal (DM RS) RE is predefined to carry one or two additional HARQ-ACK information bits, and two specific DM RS REs are predefined to carry one, two, three or four additional HARQ-ACK information bits. Specific DM RS positions within each PRB for PUCCH may be configured by RRC signaling. In view of the configured DM RS positions, a remote unit may determine whether or not to use a specific DM RS position or determine which DM RS position(s) is used to carry the additional HARQ-ACK information bits.

According to an embodiment of the present application, the additional HARQ-ACK information bits are modulated by Quadrature Phase Shift Keying (QPSK) and transmitted in the one or two predefined REs for DM RS. In response to the total number of additional HARQ-ACK information bits being odd, the orphan bit (e.g., the first bit or the last bit) within the additional HARQ-ACK information bits may be repeated twice and then modulated by QPSK to be transmitted in the one or two predefined REs for DM RS.

Figure 5:
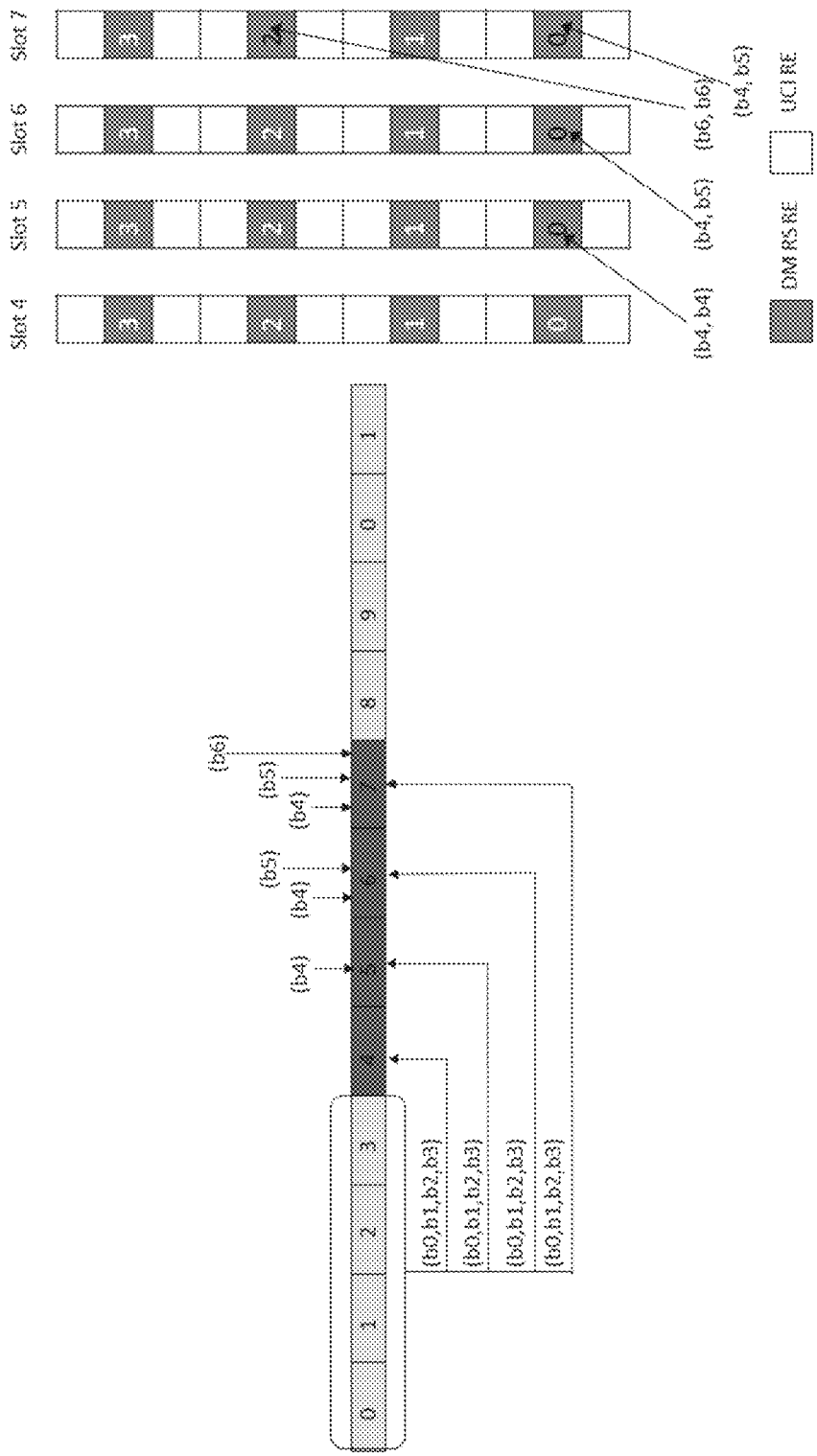
FIG. 5 illustrates an exemplary method of multiplexing HARQ-ACK feedback information according to some embodiments of the present application.

FIG. 5 illustrates an exemplary method of multiplexing HARQ-ACK feedback information according to some embodiments of the present application. As shown in FIG. 5, a given HARQ-ACK codebook corresponding to DL transmissions received in slot 0, 1, 2 and 3 is (b0, b1, b2, b3), a HARQ-ACK feedback bit for a DL transmission received in slot 4 is b4, a HARQ-ACK feedback bit for a DL transmission received in slot 5 is b5, and a HARQ-ACK feedback bit for a DL transmission received in slot 6 is b6. In view of the given HARQ-ACK codebook, b4, b5, and b6 are additional HARQ-ACK information bits. The given HARQ-ACK codebook has four transmission opportunities and can be attempted to transmit in slot 4, 5, 6 or 7.

The right part of FIG. 5 shows a structure of a PRB in slots 4, 5, 6, and 7, wherein each RPB includes twelve REs. As shown in FIG. 5, twelve REs of each PRB of slots 4, 5, 6, and 7 include four DM RS REs and eight UCI REs, and these DM RS REs and UCI REs are arranged between average intervals in a PRB. The number of DM RS REs or UCI REs in a PRB may vary, and DM RS REs and UCI REs may be arranged between non-average intervals in the PRB.

According to some embodiments of the present application, PUCCH format 2 is used to transmit a given HARQ-ACK codebook of (b0, b1, b2, b3). Multiple PRBs may be used for transmitting the PUCCH format 2, and each PRB may have the same pattern for transmitting additional HARQ-ACK information bits. Details of some embodiments of the present application are described as follows.

In the case that PUCCH format 2 carrying the given HARQ-ACK codebook is transmitted in slot 4, since no additional HARQ-ACK information bit is transmitted in slot 4, all four DM RS REs in slot 4 (i.e., DM RS RE 0, 1, 2, and 3 within slot 4 as shown in the right part of FIG. 5) are only used for PUCCH DM RS transmission.

In the case that the given HARQ-ACK codebook could not be transmitted in slot 4, the PUCCH format 2 carrying the given HARQ-ACK codebook is to be transmitted in slot 5, and b4 is also to be transmitted in slot 5. To multiplex b4 into the given HARQ-ACK codebook, one solution is repeating b4 twice, modulating double b4s to one QPSK symbol, and transmitting the modulated symbol in a DM RS RE within a PRB for the PUCCH (e.g., DM RS RE 0 in slot 5 in the right part of FIG. 5).

In the case that the given HARQ-ACK codebook could not be transmitted in slots 4 and 5, the PUCCH format 2 carrying the given HARQ-ACK codebook is to be transmitted in slot 6, and b4 and b5 are also to be transmitted in slot 6. So as to multiplex b4 and b5 into the given HARQ-ACK codebook, one solution is modulating b4 and b5 to one QPSK symbol and transmitting the modulated symbol in a DM RS RE within a PRB for the PUCCH (e.g., DM RS RE 0 in slot 6 in the right part of FIG. 5).

In the case that the given HARQ-ACK codebook could not be transmitted in slots 4, 5, and 6, the PUCCH format 2 is to be transmitted in slot 7, and b4, b5, and b6 are also to be transmitted in slot 7. To multiplex b4, b5, and b6 into the given HARQ-ACK codebook, one solution is modulating b4 and b5 to one QPSK symbol and transmitting the modulated symbol in a DM RS RE within a PRB for the PUCCH (e.g., DM RS RE 0 in slot 7 in the right part of FIG. 5), and then repeating b6 twice, modulating double b6s to one QPSK symbol, and transmitting the modulated symbol in another DM RS RE within a PRB for the PUCCH (e.g., DM RS RE 2 in slot 7 in the right part of FIG. 5).

PUCCH format 3 may be used to transmit a given HARQ-ACK codebook or additional HARQ-ACK information bits. Thus, PUCCH format 3 is also applicable for all the above embodiments.

In the above embodiments of the present application, only one PUCCH for HARQ-ACK transmission is transmitted in one slot, and moreover, a remote unit has enough process time to multiplex the additional HARQ-ACK information bits on the PUCCH carrying the given HARQ-ACK codebook.

FIG. 6 illustrates an additional exemplary method of multiplexing HARQ-ACK feedback information according to some embodiments of the present application. The embodiments of FIG. 6 indicate additional HARQ-ACK information bit(s) by multiplying an orthogonal sequence on a DM RS of an uplink channel. An orthogonal sequence may be multiplied on a DM RS in frequency domain or time domain. Within each PRB of PUCCH carrying a given HARQ-ACK codebook, multiple frequency domain orthogonal cover codes (OCCs) or time domain OCC used on DM RS may be predefined to carry an additional HARQ-ACK information bit(s).

Specifically, FIG. 6 shows one example of eight orthogonal sequences indicating ACK/NACK for different number of additional HARQ-ACK information bits (b4), (b4, b5) and (b4, b5, b6). As can be seen, for a single bit of b4, only the first and second OCCs (i.e., $1^{st}$ and $2^{nd}$ OCC codes) are used for indicating ACK or NACK; for two bits of b4 and b5, the first OCC to the fourth OCC (i.e., $1^{st}$ to $4^{th}$ OCC codes) are used for indicating combinations of ACK and NACK; and for three bits of b4, b5 and b6, the first OCC to the eighth OCC (i.e., $1^{st}$ to $8^{th}$ OCC codes) are used for indicating combinations of ACK and NACK.

In some embodiments of the present application, a remote unit and a base unit have the same knowledge about mapping relationship(s) between each OCC and ACK/NACK. For example, mapping relationship(s) between an OCC and ACK/NACK may be configured by RRC signaling. In view of the configured mapping relationship(s) between an OCC and ACK/NACK, a remote unit may determine whether or not to use a specific OCC on a DM RS or determine which OCC is used to carry the additional HARQ-ACK information bit(s).

For instance, a base unit configures a mapping relationship table between each OCC and ACK/NACK by RRC signaling, and a remote unit has the same knowledge about the RRC configured mapping relationship table. In order to multiplex an additional HARQ-ACK information bit, the remote unit modulates a specific OCC indicating the additional HARQ-ACK information bit on DM RS REs within a PUCCH of a slot, wherein the PUCCH of the slot carries a given HARQ-ACK codebook. After receiving the PUCCH from the slot, the base unit demodulates DM RS REs in the PUCCH and obtains the specific OCC. Through searching the mapping relationship table between each OCC and ACK/NACK, the base unit determines the ACK/NACK value that the specific OCC actually represents. During the above process, a remote unit multiplexes an additional HARQ-ACK information bit into a given HARQ-ACK codebook by using an OCC on DM RS, and the base unit may correctly receive all HARQ-ACK feedback from the remote unit.

According to some embodiments of the present application, the additional HARQ-ACK information bits are mapped to multiple OCCs. Each OCC of the multiple OCCs may be predefined to map a combination of ACK and NACK. NACK may also be bundled with Discontinuous Transmission (DTX) and represented as NACK/DTX. A remote unit may assign the same number of OCCs as a total number of additional HARQ-ACK information bit(s) to additional HARQ-ACK information bit(s).

Figure 7:
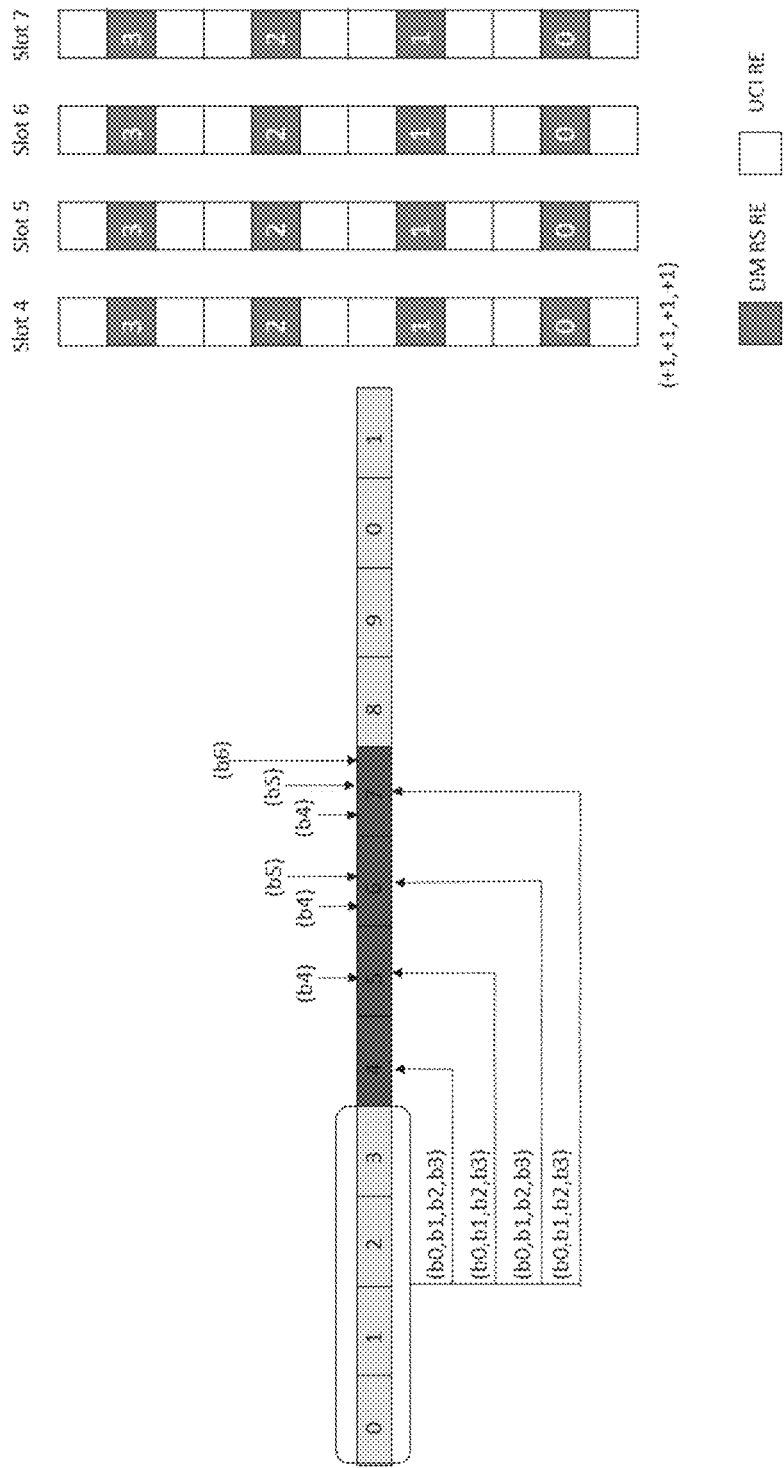
FIG. 7 illustrates a further exemplary method of multiplexing HARQ-ACK feedback information according to some embodiments of the present application.

FIG. 7 illustrates a further exemplary method of multiplexing HARQ-ACK feedback information according to some embodiments of the present application. FIG. 7 shows specific applications of embodiments of FIG. 6. According to the embodiments of FIG. 7, a given HARQ-ACK codebook of (b0, b1, b2, b3) has four transmission opportunities and is allowed to be transmitted in slot 4, 5, 6 or 7. PUCCH format 2 or PUCCH format 3 may be used to transmit a given HARQ-ACK codebook of (b0, b1, b2, b3). Moreover, multiple PRBs may be used to transmit PUCCH format 2 or PUCCH format 3, and each PRB of the multiple PRBs may have the same format for transmitting additional HARQ-ACK information bit(s). Details of embodiments are described as follows.

In the case that PUCCH format 2 carrying a given HARQ-ACK codebook of (b0, b1, b2, b3) is transmitted in slot 4, no OCC is used on the 4 DM RS REs within each PRB.

Alternatively, In the case that PUCCH format 2 carrying the given HARQ-ACK codebook is transmitted in slot 4, OCC of {+1, +1, +1, +1} may be used on four DM RS REs within one PRB in PUCCH format 2 of slot 4 (as shown slot 4 in the right part of FIG. 7). In particular, for each PRB, a remote unit modulates four DM RS REs in PUCCH format 2 of slot 4 by OCC of {+1, +1, +1, +1} and transmits the PUCCH format 2 to a base unit. After demodulating four DM RS REs in PUCCH format 2 of slot 4, the base unit obtains OCC of {+1, +1, +1, +1}. Based on the same knowledge of each OCC between the remote unit and the base unit, the base unit determines that no additional HARQ-ACK information bit is transmitted in slot 4.

In the case that the given HARQ-ACK codebook could not be transmitted in slot 4, PUCCH format 2 carrying the given HARQ-ACK codebook is to be transmitted in slot 5, and the first OCC of {+1, +1, +1, +1} and the second OCC of {−1, −1, −1, −1} may be used to indicate ACK or NACK for b4 (i.e., an additional HARQ-ACK information bit), respectively.

For example, as shown in FIG. 6, the first OCC of {+1, +1, +1, +1} is predefined to indicate ACK and the second OCC of {−1, −1, −1, −1} is predefined to indicate NACK. In response to b4 being ACK, four DM RS REs in PUCCH format 2 of slot 5 are modulated by the first OCC of {+1, +1, +1, +1}. In response to b4 being NACK, four DM RS REs in PUCCH format 2 of slot 5 are modulated by the second OCC of {−1, −1, −1, −1}. After demodulating four DM RS REs in PUCCH format 2 of slot 5, a base unit obtains the first OCC of {+1, +1, +1, +1} or the second OCC of {−1, −1, −1, −1}. Based on the same knowledge of each OCC between the remote unit and the base unit, the base unit determines that the additional HARQ-ACK information bit transmitted in slot 5 is ACK or NACK. After decoding four DM RS REs in PUCCH format 2 of slot 5, a base unit obtains the given HARQ-ACK codebook.

In the case that the given HARQ-ACK codebook could not be transmitted in slots 4 and 5, PUCCH format 2 carrying the given HARQ-ACK codebook is to be transmitted in slot 6, and the first OCC to the fourth OCC (i.e., 1st to 4th OCC codes) are used for indicating ACK or NACK for (b4, b5) (i.e., additional HARQ-ACK information bits).

For example, as shown in FIG. 6, the first OCC of {+1, +1, +1, +1} is predefined to indicate that (b4, b5) is (ACK, ACK), the second OCC of {−1, −1, −1, −1} is predefined to indicate that (b4, b5) is (NACK, ACK), the third OCC of {+1, +1, −1, −1} is predefined to indicate that (b4, b5) is (ACK, NACK), and the fourth OCC of {−1, −1, +1, +1} is predefined to indicate that (b4, b5) is (NACK, NACK).

In response to (b4, b5) being (ACK, ACK), four DM RS REs in PUCCH format 2 of slot 6 are modulated by the first OCC of {+1, +1, +1, +1}. In response to (b4, b5) being (NACK, ACK), four DM RS REs in PUCCH format 2 of slot 6 are modulated by the second OCC of {−1, −1, −1, −1}. In response to (b4, b5) being (ACK, NACK), four DM RS REs in PUCCH format 2 of slot 6 are modulated by the third OCC of {+1, +1, −1, −1}. In response to (b4, b5) being (NACK, NACK), four DM RS REs in PUCCH format 2 of slot 6 are modulated by the fourth OCC of {−1, −1, +1, +1}.

After demodulating four DM RS REs in PUCCH format 2 of slot 6, a base unit obtains a specific OCC; based on the same knowledge of each OCC between the remote unit and the base unit, the base unit determines the additional HARQ-ACK information bits actually transmitted in slot 6. After decoding four DM RS REs in PUCCH format 2 of slot 6, a base unit obtains the given HARQ-ACK codebook.

In the case that the given HARQ-ACK codebook could not be transmitted in slots 4, 5, and 6, PUCCH format 2 carrying the given HARQ-ACK codebook is to be transmitted in slot 7, and the first OCC to the eighth OCC (i.e., $1^{st}$ to $8^{th}$ OCC codes) are used for indicating ACK or NACK for (b4, b5, b6) (i.e., additional HARQ-ACK information bits). The specific manners of multiplexing additional HARQ-ACK information bits to the given HARQ-ACK codebook are similar to the above described embodiments.

PUCCH format 3 is also applicable for all the above embodiments. As described in the above embodiments, only one PUCCH for HARQ-ACK transmission is transmitted in one slot, and moreover, a remote unit has enough processing time to multiplex the additional HARQ-ACK information bits on the PUCCH carrying the given HARQ-ACK codebook.

Figure 8:
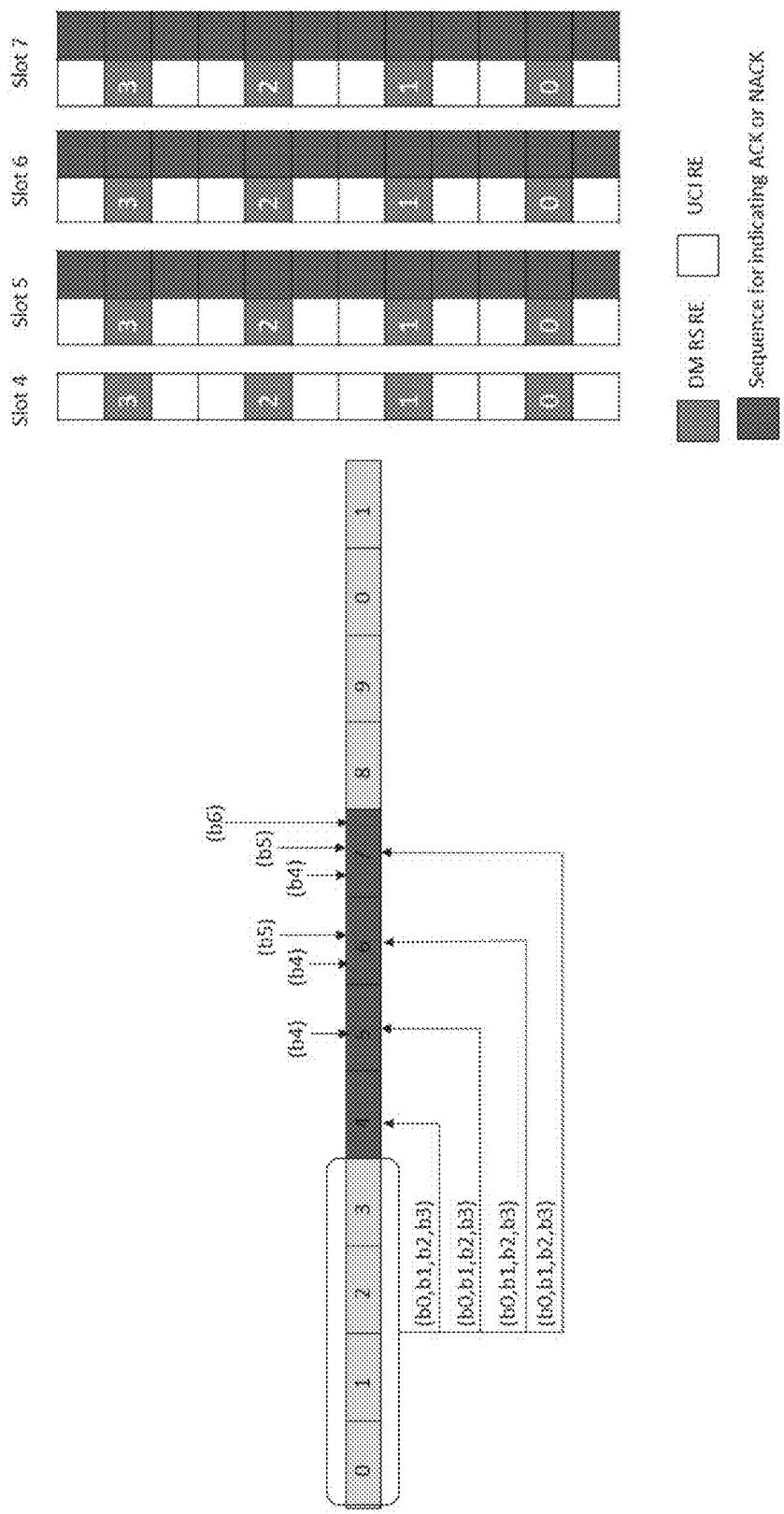
FIG. 8 illustrates another exemplary method of multiplexing HARQ-ACK feedback information according to some embodiments of the present application.

FIG. 8 illustrates another exemplary method of multiplexing HARQ-ACK feedback information according to some embodiments of the present application. According to the embodiments of FIG. 8, one or more sequences are used to indicate ACK or NACK for additional HARQ-ACK information bit(s). In particular, in frequency domain, one or more sequences indicating additional HARQ-ACK information bit(s) are repeated in one or more PRBs that are used to transmit a PUCCH carrying a given HARQ-ACK codebook; and in time domain, one or more sequences indicating additional HARQ-ACK information bit(s) are transmitted in different symbols that are used to transmit a PUCCH carrying the given HARQ-ACK codebook. Each sequence indicating additional HARQ-ACK information bit(s) may include 12 REs. The one or more sequences may be orthogonal sequences.

A remote unit and a base unit have the same knowledge about positions and meanings of one or more sequences indicating additional HARQ-ACK information bit(s). For instance, one or more sequences may be configured by radio resource control (RRC) signaling. The one or more sequences may be multiplexed in the same time-frequency resource. The positions of one or more sequences indicating additional HARQ-ACK information bit(s) in frequency domain or time domain may be indicated by downlink control information (DCI) signaling. For example, a specific sequence indicating an additional HARQ-ACK information bit(s) immediately follows the last symbol of the PUCCH carrying the given HARQ-ACK codebook and does not cross a slot boundary between different slots.

According to some embodiments of the present application, one or more sequences are predefined to indicate each HARQ-ACK bit of additional HARQ-ACK information bit(s) and transmitted in a slot. For instance, two sequences correspond to ACK or NACK for one additional HARQ-ACK information bit, and the total number of sequences indicating all additional HARQ-ACK information bits is not larger than 12. In the case that more than one bit is multiplexed, the corresponding sequences are multiplexed in same time-frequency resource. Twelve sequences can support up to six additional HARQ-ACK information bits multiplexing in same slot.

Specifically, if additional HARQ-ACK information bits are (b4, b5, b6) (i.e., three additional HARQ-ACK information bits), six sequences are needed to indicate ACK or NACK of each of (b4, b5, b6). Moreover, a remote unit and a base unit have the same knowledge about meanings of the six sequences of the three additional HARQ-ACK information bit(s). In the case of transmitting (b4, b5, b6), three sequences are actually transmitted from a remote unit to a base unit to indicate ACK/NACK of each of (b4, b5, b6).

For instance, as shown in the right part of FIG. 8, in the case that a given HARQ-ACK codebook could not be transmitted in slot 4, a PUCCH in slot 5 carries the given HARQ-ACK codebook, and an orthogonal sequence indicating ACK/NACK of b4 is transmitted in slot 5. In the case that the given HARQ-ACK codebook could not be transmitted in slots 4 and 5, a PUCCH in slot 6 carries the given HARQ-ACK codebook, and two orthogonal sequence indicating ACK/NACK of b4 and b5 are transmitted in slot 6 (wherein one orthogonal sequence indicates ACK/NACK of b4 and the other orthogonal sequence indicates ACK/NACK of b5). In the case that the given HARQ-ACK codebook could not be transmitted in slots 4, 5, and 6, a PUCCH in slot 7 carries the given HARQ-ACK codebook, and three orthogonal sequence indicating ACK/NACK of b4, b5, and b6 are transmitted in slot 7 (wherein the first orthogonal sequence indicates ACK/NACK of b4, the second orthogonal sequence indicates ACK/NACK of b5, and the third orthogonal sequence indicates ACK/NACK of b6).

Through the above manner, additional HARQ-ACK information bits are multiplexed in the given HARQ-ACK codebook. Since a base unit has the same knowledge about meanings of the six sequences of the three additional HARQ-ACK information bit(s) as a remote unit, after receiving one or more orthogonal sequences from the same slot as the given HARQ-ACK codebook, the base unit may correctly determine additional HARQ-ACK information bits as well as the given HARQ-ACK codebook.

According to some embodiments of the present application, all additional HARQ-ACK information bits are bundled to one bit by a logic AND operation, and only two sequences are needed for indicating the bundled bit. A remote unit and a base unit have the same knowledge about meanings of the two sequences of the bundled HARQ-ACK information bit(s). Specifically, in the case that additional HARQ-ACK information bits are (b4, b5, b6) (i.e., three additional HARQ-ACK information bits), three ACK/NACK bits of (b4, b5, b6) are bundled to one ACK/NACK bit. Only all the ACK/NACK bits are ACK, the bundled bit is ACK; otherwise, the bundled bit is NACK. For example, in the case that b4 is ACK, b5 is ACK, and b6 is NACK, after performing a logical "AND" operation to these three values, the bundled bit of (b4, b5, b6) is NACK. In the case that b4 is ACK, b5 is ACK, and b6 is ACK, after performing a logical "AND" operation to these three values, the bundled bit of (b4, b5, b6) is ACK. In the case of transmitting (b4, b5, b6), one sequence is actually transmitted from a remote unit to a base unit to indicate ACK/NACK of the bundled bit of (b4, b5, b6).

For instance, as shown in the right part of FIG. 8, in the case that a given HARQ-ACK codebook could not be transmitted in slot 4, a PUCCH in slot 5 carries the given HARQ-ACK codebook, and an orthogonal sequence indicating ACK/NACK of b4 is transmitted in slot 5. In the case that the given HARQ-ACK codebook could not be transmitted in slots 4 and 5, a PUCCH in slot 6 carries the given HARQ-ACK codebook, and one orthogonal sequence indicating ACK/NACK of the bundled bit of (b4, b5) is transmitted in slot 6. In the case that the given HARQ-ACK codebook could not be transmitted in slots 4, 5, and 6, a PUCCH in slot 7 carries the given HARQ-ACK codebook, and one orthogonal sequence indicating ACK/NACK of the bundled bit of (b4, b5, b6) is transmitted in slot 7.

In the above embodiments, only one PUCCH for HARQ-ACK transmission is transmitted in one slot. Moreover, a remote unit has enough processing time to multiplex the additional HARQ-ACK information bits on the PUCCH carrying the given HARQ-ACK codebook.

Figure 9:
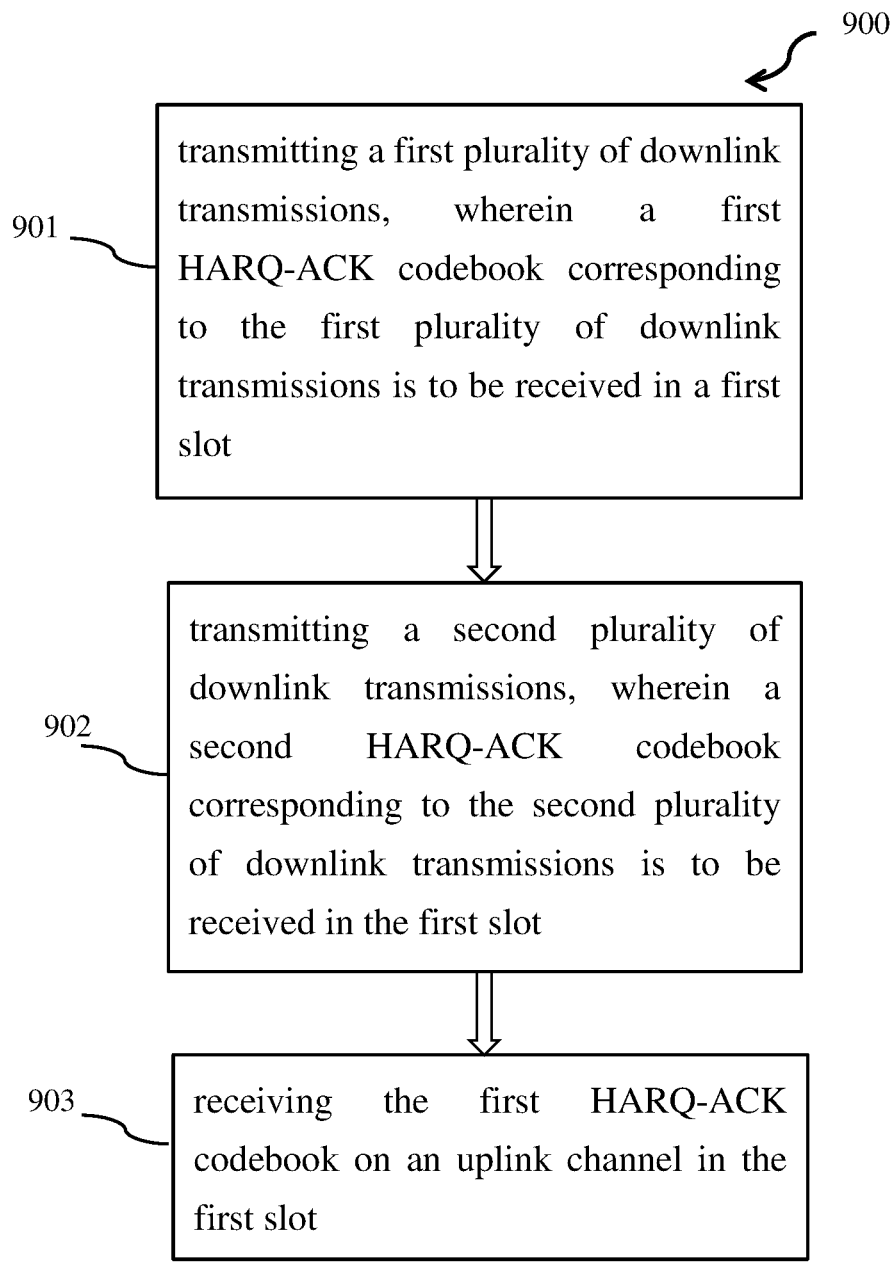
FIG. 9 illustrates a flowchart demonstrating operations of a base unit according to some embodiments of the present application.

FIG. 9 illustrates a flowchart demonstrating operations of a base unit according to some embodiments of the present application. In some embodiments of the present application, the method 900 is performed by an apparatus, such as the base units 102. In some embodiments of the present application, the method 900 is performed by a processor executing program codes, for example, a microcontroller, a microprocessor, a CPU, a GPU, an auxiliary processing unit, a FPGA, or the like.

In step 901 of FIG. 9, a first plurality of downlink transmissions are transmitted, wherein a first HARQ-ACK codebook corresponding to the first plurality of downlink transmissions is to be received in a first slot. In step 902 of FIG. 9, a second plurality of downlink transmissions are transmitted, wherein a second HARQ-ACK codebook corresponding to the second plurality of downlink transmissions is to be received in the first slot. In step 903 of FIG. 9, a first HARQ-ACK codebook is received on an uplink channel in the first slot. In some embodiments of the present application, a second HARQ-ACK codebook corresponding to the second plurality of downlink transmissions is also transmitted in the first slot. For example, the second HARQ-ACK codebook is also transmitted on the uplink channel in the first slot. The second HARQ-ACK codebook may be modulated and transmitted in one or more time-frequency resource elements (REs) of the uplink channel.

All embodiments described in the present application, for example, all embodiments described for FIGS. 5-8, are applicable for the flowchart of FIG. 9.

Figure 10:
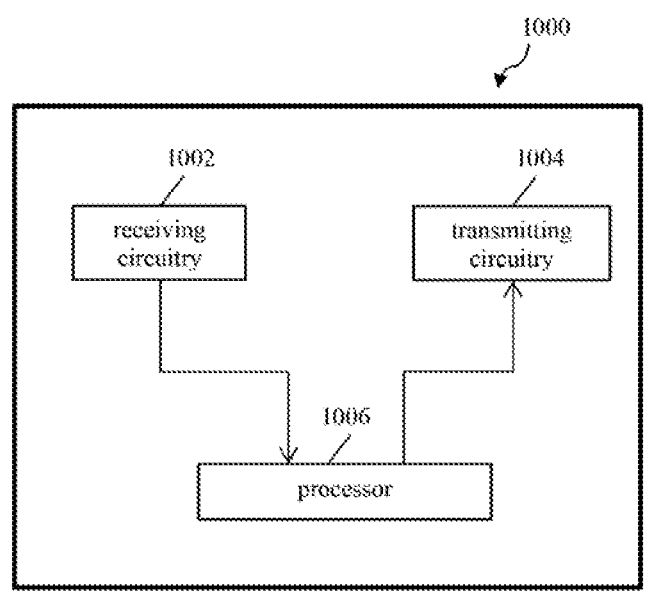
FIG. 10 illustrates a block diagram of an apparatus according to some embodiments of the present application.

FIG. 10 illustrates a block diagram of an apparatus according to some embodiments of the present application.

As shown in FIG. 10, the apparatus 1000 may include a non-transitory computer-readable medium (not shown), a receiving circuitry 1002, a transmitting circuitry 1304, and a processor 1306 coupled to the non-transitory computer-readable medium, the receiving circuitry and the transmitting circuitry. The apparatus 1000 may be a base station or a relay. Although in this figure, elements such as processor, transmitting circuitry, and receiving circuitry are described in the singular, the plural is contemplated unless limitation to the singular is explicitly stated. In some embodiments, the receiving circuitry 1002 and the transmitting circuitry 1004 are combined into a single device, such as a transceiver. In certain embodiments, the apparatus 1000 may further include an input device, a memory, and/or other components.

In some embodiments, the non-transitory computer-readable medium may have stored thereon computer-executable instructions to cause a processor to implement the steps with respect to the RN as described above. For example, the computer-executable instructions, in the case of being executed, cause the processor 1006 interacting with receiving circuitry 1002 and transmitting circuitry 1004, so as to perform the steps with respect to the RNs depicted in FIGS. 7 and 10-12.

In some embodiments, the non-transitory computer-readable medium may have stored thereon computer-executable instructions to cause a processor to implement the steps with respect to the base station as described above. For example, the computer-executable instructions, in the case of being executed, cause the processor 906 interacting with receiving circuitry 1002 and transmitting circuitry 1004, so as to perform the steps with respect to the BS or Donor BS depicted in FIGS. 7 and 10-12.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
   receiving a first plurality of downlink transmissions;
   generating a first hybrid automatic repeat request acknowledgement (HARQ-ACK) codebook corresponding to the first plurality of downlink transmissions, wherein the first HARQ-ACK codebook is to be transmitted in a first slot;
   receiving a second plurality of downlink transmissions;
   generating a second hybrid HARQ-ACK codebook corresponding to the second plurality of downlink transmissions, wherein the second HARQ-ACK codebook is to be transmitted in the first slot;
   transmitting the first HARQ-ACK codebook on an uplink channel in the first slot; and
   transmitting information indicating the second HARQ-ACK:
   in one or more demodulation reference signal REs of the uplink channel;
   based on multiplying an orthogonal sequence on a demodulation reference signal of the uplink channel; or
   in a sequence in the first slot.

2. The method of claim 1, further comprising transmitting the second HARQ-ACK codebook on the uplink channel.

3. The method of claim 2, wherein the second HARQ-ACK codebook is modulated and transmitted in one or more time-frequency resource elements (REs) of the uplink channel.

4. The method of claim 3, wherein the first HARQ-ACK codebook is transmitted in the remaining resource elements of the uplink channel.

5. The method of claim 1, further comprising transmitting the second HARQ-ACK codebook in the one or more demodulation reference signal REs of the uplink channel.

6. The method of claim 1, further comprising indicating the second HARQ-ACK codebook by multiplying the orthogonal sequence on the demodulation reference signal of the uplink channel.

7. The method of claim 6, wherein the orthogonal sequence is multiplied on the demodulation reference signal in frequency domain or time domain.

8. The method of claim 1, further comprising transmitting one or more sequences in the first slot for indicating each HARQ-ACK information bit in the second HARQ-ACK codebook, wherein the one or more sequences are multiplexed in the same time-frequency resource.

9. The method of claim 1, further comprising transmitting the sequence in the first slot for indicating the second HARQ-ACK codebook.

10. The method of claim 9, wherein all HARQ-ACK information bits in the second HARQ-ACK codebook are bundled to one bit by a logical "AND" operation, and the sequence indicates the one bit.

11. A method performed by a base station, the method comprising:
   transmitting a first plurality of downlink transmissions, wherein a first hybrid automatic repeat request acknowledgement (HARQ-ACK) codebook corresponding to the first plurality of downlink transmissions is to be received in a first slot;
   transmitting a second plurality of downlink transmissions, wherein a second HARQ-ACK codebook corresponding to the second plurality of downlink transmissions is to be received in the first slot;
   receiving the first HARQ-ACK codebook on an uplink channel in the first slot; and receiving information indicating the second HARQ-ACK:
   in one or more demodulation reference signal REs of the uplink channel;
      based on multiplying an orthogonal sequence on a demodulation reference signal of the uplink channel; or
   in a sequence in the first slot.

12. The method of claim 11, further comprising receiving the second HARQ-ACK codebook on the uplink channel.

13. The method of claim 12, wherein the second HARQ-ACK codebook is received in one or more time-frequency resource elements of the uplink channel.

14. The method of claim 13, wherein the first HARQ-ACK codebook is received in the remaining resource elements of the uplink channel.

15. The method of claim 11, further comprising receiving the second HARQ-ACK codebook in the one or more demodulation reference signal resource elements of the uplink channel.

16. The method of claim 11, further comprising receiving the second HARQ-ACK codebook indicated by multiplying the orthogonal sequence on the demodulation reference signal of the uplink channel.

17. The method of claim 16, wherein the orthogonal sequence is multiplied on the demodulation reference signal in frequency domain or time domain.

18. The method of claim 11, further comprising receiving one or more sequences in the first slot for indicating each HARQ-ACK information bit in the second HARQ-ACK codebook, wherein the one or more sequences are multiplexed in the same time-frequency resource.

19. A user equipment (UE), comprising:
at least one memory; and
at least one processor coupled with the at least one memory and configured to cause the UE to:
   receive a first plurality of downlink transmissions;
   generate a first hybrid automatic repeat request acknowledgement (HARQ-ACK) codebook corresponding to the first plurality of downlink transmissions, wherein the first HARQ-ACK codebook is to be transmitted in a first slot;
   receive a second plurality of downlink transmissions;
   generate a second hybrid HARQ-ACK codebook corresponding to the second plurality of downlink transmissions, wherein the second HARQ-ACK codebook is to be transmitted in the first slot;
   transmit the first HARQ-ACK codebook on an uplink channel in the first slot; and
   transmit information indicating the second HARQ-ACK:
      in one or more demodulation reference signal REs of the uplink channel;
      based on multiplying an orthogonal sequence on a demodulation reference signal of the uplink channel; or
      in a sequence in the first slot.

20. A base station, comprising:
at least one memory; and
at least one processor coupled with the at least one memory and configured to cause the base station to:
   transmit a first plurality of downlink transmissions, wherein a first hybrid automatic repeat request acknowledgement (HARQ-ACK) codebook corresponding to the first plurality of downlink transmissions is to be received in a first slot;
   transmit a second plurality of downlink transmissions, wherein a second HARQ-ACK codebook corresponding to the second plurality of downlink transmissions is to be received in the first slot;
   receive the first HARQ-ACK codebook on an uplink channel in the first slot; and
   receive information indicating the second HARQ-ACK:
      in one or more demodulation reference signal REs of the uplink channel;
      based on multiplying an orthogonal sequence on a demodulation reference signal of the uplink channel; or
      in a sequence in the first slot.

\* \* \* \* \*